Sept. 16, 1941.  D. H. CLEWELL ET AL  2,255,876
GRAVITY METER
Filed March 6, 1940  3 Sheets-Sheet 1
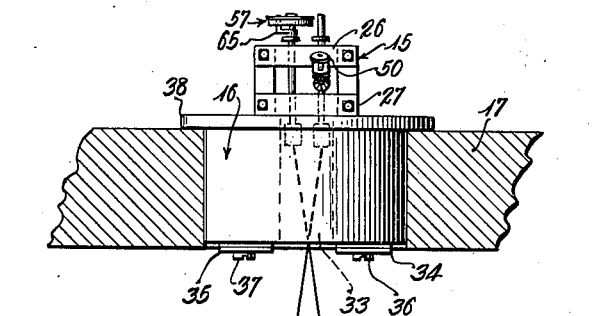
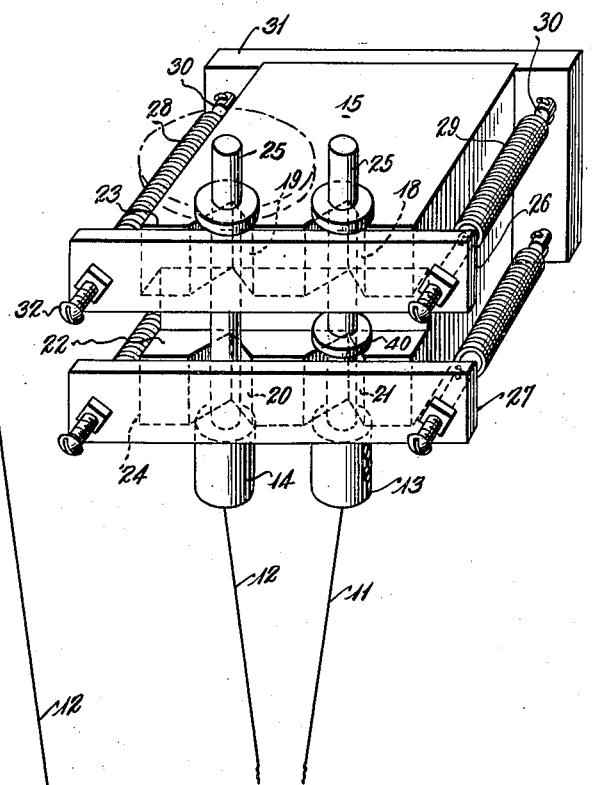
Fig. 1.
Fig. 2.
Inventors
Dayton H. Clewell and
Henry A. Maeder
By
Attorney Sept. 16, 1941.   D. H. CLEWELL ET AL   2,255,876
GRAVITY METER
Filed March 6, 1940   3 Sheets-Sheet 2
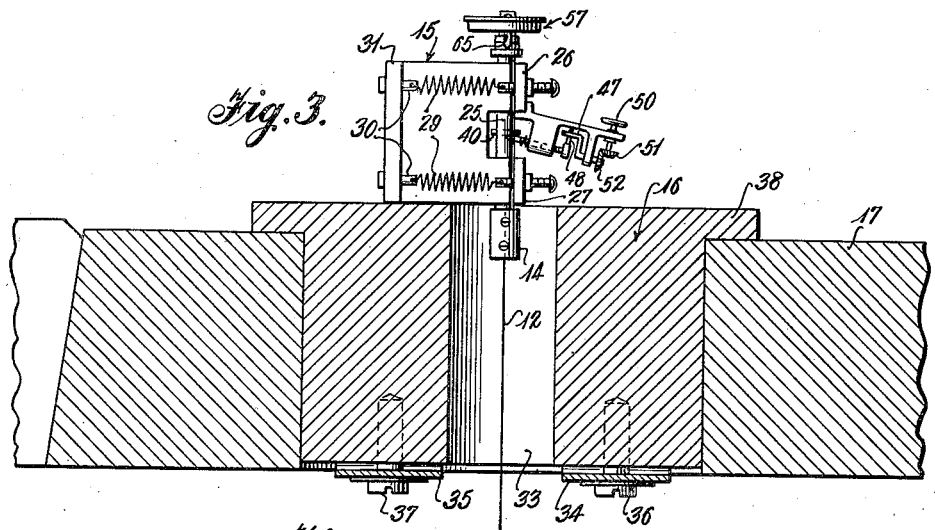

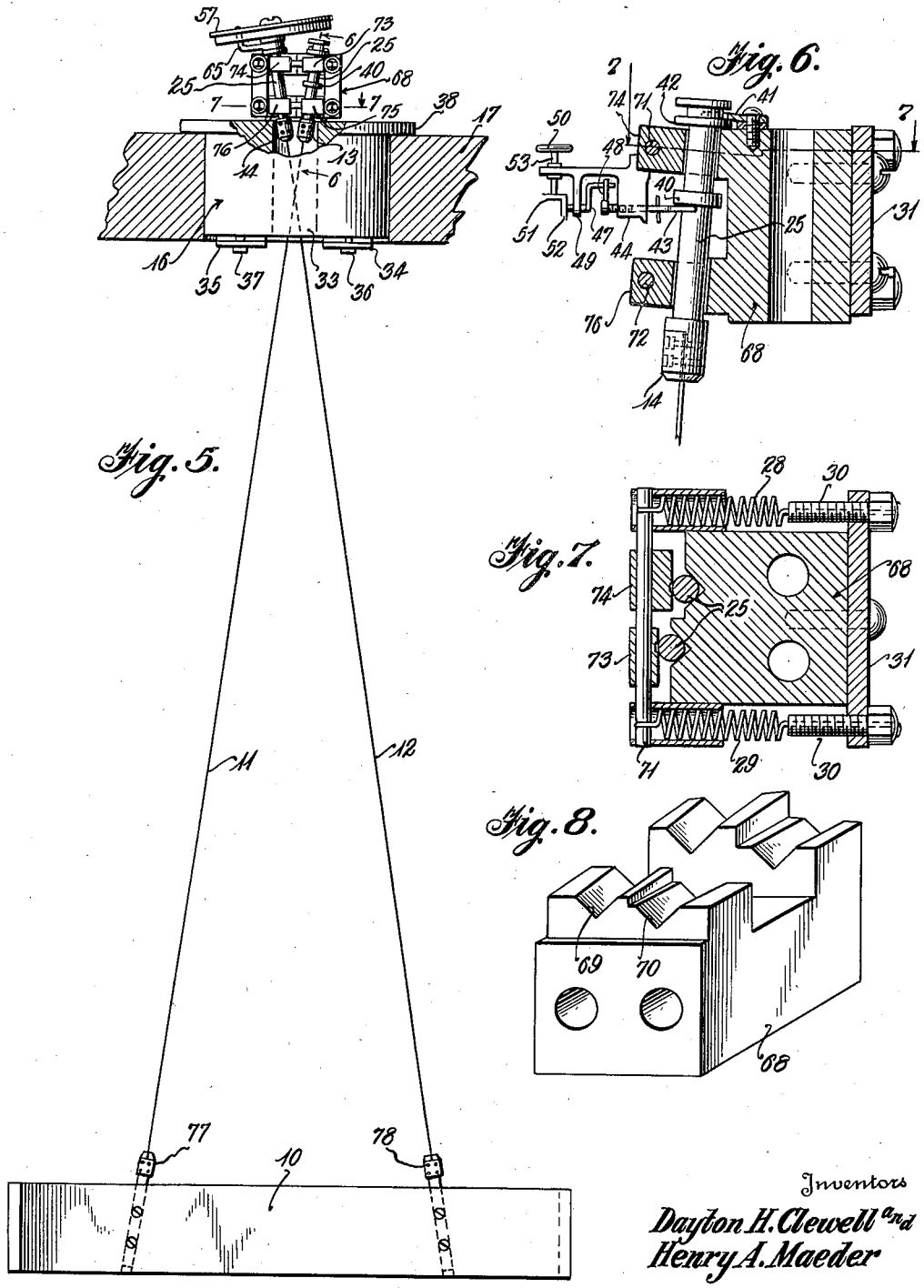

Patented Sept. 16, 1941

2,255,876

UNITED STATES PATENT OFFICE 2,255,876

GRAVITY METER

Dayton H. Clewell and Henry A. Maeder, Dallas, Tex., assignors, by mesne assignments, to Socony-Vacuum Oil Company, Incorporated, New York, N. Y., a corporation of New York Application March 6, 1940, Serial No. 322,498

14 Claims. (Cl. 265—1.4)

This invention relates generally to geophysical surveying instruments and more particularly to force measuring instruments for measuring gravitational force or variations in gravitational force from point to point on the earth's surface.

It is well known to those familiar with the geology of the substrata of the earth's surface that in particular areas, such as the Gulf Coast of the United States, structures such as faults, anticlines, or salt domes are in the majority of cases indicative of the existence of an accumulation of oil that can be produced in commercial quantities.

It is well known in the art that these subsurface structures exert an influence on the gravitational force at the earth's surface. Therefore, by measuring the variations in gravitational force from point to point on the earth's surface, these geological structures can be localized and the accompanying accumulation of oil produced in the usual manner.

Due to the fact that the variation of gravitational force from one point to another will be sometimes no more than $\frac{1}{10}$ of one millidyne, it is necessary that extremely sensitive force measuring instruments be provided for measuring this variation. Numerous designs of instruments for detecting and measuring this variation in gravitational force have been heretofore used, with a measure of success, but their lack of extreme sensitivity and the presence of drift in the instrument, due primarily to design, limited their accuracy and introduced many correction factors that are a burden to the interpreter who attempts to correlate the data obtained from these instruments.

Many of the instruments of the prior art are of the type that utilize a single torsional element, while others use a plurality of elastic suspension elements for supporting the mass; but none of these designs appear to be as sensitive as that type of meter disclosed in the Hart Brown Patent No. 2,125,282 which utilized a mass that is supported by bifilar torsion elements. Therefore, the instant invention is directed to improvements in gravity meters of the type disclosed by the Hart Brown patent.

In order to operate this type of force measuring instrument at its maximum sensitivity, it is necessary that torsion be applied to the bifilar suspension elements until the mass is rotated through an angle that will lie between 90 and 180°, which angle will be just below that at which the suspended mass is in a state of unstable equilibrium. Therefore, some means must be provided whereby torsional forces can be applied to the bifilar suspension elements and to maintain the torsional forces in the element in such a manner that they will not vary during transportation and use of the instrument.

Once the instrument is calibrated through the adjustment of the torsional forces in the suspension element it is desirable to maintain this calibration. Where the elements by means of which torsion is applied to the suspension elements protrude to such an extent that the operator of the instrument is likely to come in contact with them, and as a result disturb the calibration of the instrument, it is desirable that some means be provided whereby positive connection between the torsion adjusting element and the suspension element can be broken.

When assembling gravity meters of the bifilar suspended mass type, it sometimes results that after the mass has been suspended from the support by the suspension elements, it is not level. An instrument could be operated with the mass out of level relative to the support but readings of displacement would be obtained which when plotted against the variations in gravitational force would not give a linear curve. Therefore, it is desirable to provide some means whereby the mass can be oriented relative to the horizontal plane of the support.

Sometimes in calibrating an instrument of the character described above, it is necessary to rotate the entire torsion head. To this end means are provided that will apply frictional force to the head and permit it to rotate any desired amount and yet positively hold the head in its adjusted position.

Gravity meters of the type that have their mass supported by bifilar torsional elements have heretofore produced considerable drift due to the necessity for making a short bend in the suspension elements at a point adjacent their point of attachment to the chucks, by rotating the mass to its operating position. Due to the sharpness of this bend and the weight of the mass, the torsional elements will from day to day change in physical characteristics that tend to permanently distort them. One embodiment of the present invention obviates these difficulties with the result that drift occasioned in the manner described above is completely eliminated.

Therefore, the primary object of this invention resides in the provision of means whereby torsion may be applied to the bifilar suspension elements of a gravity meter and means whereby the torsional forces can be maintained within the elements.

Another object of this invention resides in the provision of means for adjusting the torsional forces in the bifilar suspension element that are disposed in axial alignment with the torsional element when the mass is in calibrated position.

Still another object of this invention resides in the provision of means whereby the torsion applying elements can be disconnected from positive contact with the torsion elements.

It is another object of the present invention to provide means whereby direct contact between the torsion applying element and the torsion element will operate a signal.

This invention also contemplates means whereby the torsion head of the instrument can be rotated and frictionally held in its adjusted position.

Still another object of this invention resides in the provision of means whereby the mass can be oriented relative to the horizontal plane of the support without disconnecting the mass from the support.

Other objects and advantages will become apparent from the following detailed description when viewed in the light of the drawings, in which:

Figure 1 is a side elevational view of one embodiment of the bifilar suspended mass type of gravity meter showing improvements in accordance with the present invention applied thereto;

Figure 2 is an enlarged perspective view of the V-block and associated elements which form clamping means for the torsion element chucks;

Figure 3 is an enlarged vertical sectional view of the torsion head base showing the frictional holding means which prevent the base from rotating once it has been adjusted;

Figure 4 is a bottom plan view of the torsion head base shown in Figure 3;

Figure 5 is a front elevation of another embodiment of the V-block and its associated elements which form clamping means for the torsion element chucks;

Figure 6 is a detail sectional view of the V-block and associated clamping elements taken along the line 6—6 of Figure 5, additionally showing the means by which the mass is oriented relative to the horizontal plane of the support;

Figure 7 is a cross-sectional view of the V-block and associated elements taken along the line 7—7 of Figure 6;

Figure 8 is a perspective view of the V-block showing the inclination of the V-grooves therein;

Figure 9 is a plan view of the torsion adjusting means showing the signalling circuit by means of which the operator can ascertain whether or not the torsion adjusting means is in direct contact with the torsion element chucks;

Figure 10 is a detail sectional view taken along the line 10—10 of Figure 9;

Figure 11 is an enlarged detail view shown partly in section of the means for orienting the mass relative to the horizontal plane of its support; and Figure 12 is a plan view of the fork which cooperates with the collar on the torsion element chuck to raise or lower one end of the suspended mass.

Referring to the drawings in detail, particularly Figure 1, there is shown a mass 10 supported by bifilar torsion elements 11 and 12 that are secured at their upper end to chucks 13 and 14. These elements 11 and 12 are so affixed to the chuck members 13 and 14 that they are in axial alignment with them. Chucks 13 and 14 are carried by a V-block 15 that is adapted to be secured in position on a torsion head 16. Torsion head 16 is recessed within a support 17 which forms a part of the housing for the gravity meter.

One of the vertical faces of V-block 15 is divided by a channel 22 which extends horizontally across the midportion thereof. Channel 22 divides this face of the V-block into two sections 23 and 24. The V-grooves 18, 19, 20 and 21 are cut into the faces of the sections 23 and 24 in such a manner that the two grooves 18 and 19 in section 23 lie vertically spaced from grooves 20 and 21 in section 24 but in alignment with them. These grooves, in pairs, form bearing seats for the body portion 25 of the chucks 13 and 14. The body portion 25 of chucks 13 and 14 are firmly held in the V-shaped grooves by bar-shaped elements 26 and 27 that are of substantially rectangular cross-section. In order to hold the top portion of chucks 13 and 14 firmly seated in the V-shaped grooves 18 and 19, force is exerted against the ends of the bar-shaped member 26 by the springs 28 and 29. Springs 28 and 29 are anchored by bolts 30 or other suitable means to the plate 31 that is firmly secured to the V-block or made integral therewith. The other ends of springs 28 and 29 are adjustably secured by means of bolts 32 to the ends of bar-shaped member 26. The bar-shaped member 26 is therefore caused to exert a force directly against the top body portion of each chuck to hold it firmly within the V-grooves that form its bearing seat. The bottom body portions of chucks 13 and 14 similarly rest in the V-shaped grooves 20 and 21 and are held firmly in them by the bar-shaped member 27. Bar-shaped member 27 has a force exerted against each end which tends to force the bottom body portions of chucks 13 and 14 firmly into the V-grooves. This force is applied to the ends of the bar-shaped member 27 in the same manner as described in connection with bar-shaped member 26.

Mounting the chucks 13 and 14 in this manner, the possibility of lateral displacement of one or both of the chucks due to wear in the bearing seat is eliminated and the same relative spacing of the chucks is retained throughout the life of the instrument. Another advantageous feature of such a mounting is that the chucks are frictionally held against rotation in their bearings. This frictional force as supplied by the walls of the V-grooves and the bar elements 26 and 27 is adequate to prevent the chucks from rotating when subjected to vibrations. Additionally, by mounting the chucks in a V-block in the manner described above, it is possible to adjust the torsional forces in either torsional element or both without the necessity for releasing clamping elements such as have been employed heretofore.

The entire V-block assembly as described above and shown in detail in Figure 2 is mounted directly on top of a rotatable torsion head base 16 in such a manner that the lower ends of the chucks 13 and 14 to which the torsional elements are secured extend into an opening 33 in the torsion head base. Opening 33 extends vertically downwardly entirely through the torsion head base and provides ample space for the torsion elements that are axially secured to the bottom ends of the chucks 13 and 14. Since it is sometimes necessary to rotate the torsion head base 16 in order to make sensitivity adjustments, some means must be provided which will positively hold this torsion head base firmly to the shoulder of the support 17 and yet allow it to rotate for purposes of adjustment. Since the V-block carrying the suspension wire chucks is mounted directly on this torsion head base 16, it is important that the base be maintained secure in its bearings at all times. To this end spring elements 34 and 35, that are secured to the bottom face of the torsion head base in such a manner that their ends extend over the base and contact the under surface of the support 17, are provided. The spring elements 34 and 35 are formed of sheet material such as bronze. Each of the elements is secured to the bottom face of the torsion head base by means of two screws 36 and 37 respectively. In order to keep the bottom of opening 33 in torsion head base 16 clear, these spring elements are disposed parallel to each other but spaced from each other a distance slightly greater than the diameter of the opening 33. Both ends of each spring extend past the peripheral edge of the torsion head base and bear firmly against the bottom surface of the support 17. Since the spring elements frictionally grip the bottom face of the support 17, they hold the torsion head base 16 firmly in its bearing and yet permit rotation for adjustment purposes. It will be noted that the upper peripheral edge of the torsion head base 16 is provided with an annular shoulder 38 which rests directly on top of the support 17. The spring elements 34 and 35 maintain the annular shoulder 38 seated firmly against the support 17 at all times.

In assembling gravity meters of this type, when securing the mass to the torsion elements and securing the torsion elements to their respective chucks, it sometimes results that the mass is not properly oriented relative to the horizontal plane of the gravity meter support or base. To compensate for this error in assembly, there is provided means which cooperate with one of the wire chucks to raise or lower this chuck relative to the other. These means are shown in detail in Figures 1, 2, 6, 11 and 12. There is secured on or made integral with the body 25 of one of the chucks, a collar 40. The chuck that carries the collar 40 is adapted to slide longitudinally in the V-grooves that form its bearings. The chuck is resiliently biased toward its lowermost position by means of a leaf spring 41 that exerts a downward force on top of the torsion adjusting element 42 of the chuck. The amount of downward movement of the chuck is limited by a fork 43 that is disposed relative to the chuck in such a manner that the ends of the fork tines contact the bottom surface of the shoulder 40 at points on opposite sides of the body portion 30 of the chuck and so that the plane of the fork makes an acute angle with the plane of the bottom surface of the collar 40. Movement of the fork toward the chuck will cause the ends of the tines to slide on the bottom surface of the collar 40 to raise the chuck. It is obvious that when the fork is moved in the opposite direction, the chuck is permitted to move downwardly due to the force exerted on its upper end by the spring 41. Fork 43 has its handle or end opposite to the tines mounted in a bearing 44 which may be made integral with the gravity meter case. The handle of the fork is adapted to slide freely in its bearing. Springs 45 that are anchored to the bearing-block 44 are secured to a plate 46' that is fixed to the fork 43. Springs 45 tend to force the fork 43 away from the chuck. The opening in the block 44 forming the bearing for the handle of the fork 43 is interiorly threaded at the end opposite the chuck and is adapted to receive a screw 46 that is disposed in axial alignment with the handle of the fork 43. Rotation of this screw which abuts the handle end of fork 43, to screw it into the opening of the bearing-block 44 forces the fork 43 out against the action of the springs 45 and causes the chuck to be raised. To lower the chuck it is only necessary to rotate this screw in the opposite direction to permit the handle of the fork to be forced further into the bearing-block 44 by the springs 45. The ends of the tines moving on the bottom surface of the collar 40 will permit the downward movement of the chuck.

Rotation of screw 46 is accomplished through means of a bell crank 47 and a pin 48 that is secured to the head of the screw 46. The bell crank 47 is rotatably mounted in a bearing-block 49 which may be made integral with the gravity meter case. The axis about which the bell crank rotates is in alignment with the axis of the screw 46. Bell crank 47 is caused to rotate on turning the manipulating knob 50 by means of the bevel gears 51 and 52. Gear 52 is secured to the bell crank 47 and gear 51 is fixed to a shaft 53 that extends upwardly through the gravity meter case and terminates with the manipulating knob 50 outside of the case. The shaft 53 is provided with collars 54 and 55 that prevent it from being displaced longitudinally. From the above detailed description, it is apparent that in order to adjust the elevation of one end of the mass 10, it is only necessary to rotate the knob 50, to screw in or out the screw 46 to displace the fork 43 relative to the collar 40 on the chuck. The pitch of the thread on screw 46 is so selected that once the elevation of the mass has been adjusted, the bell crank 47 can be turned backwardly 180° to the position 56 shown in dotted lines in Figure 11. In this manner direct connection between the manipulating knob 50 and the screw 46 is broken and slight movements of the knob 50 due to the operator coming in contact with it, will not change the fine adjustment of the mass.

As shown in Figures 1, 2 and 5, and in detail in Figures 9 and 10, means are provided in conjunction with the torsion element chucks whereby the handle 57, by means of which torsional forces are introduced into one of the torsion elements, can be disengaged from the chuck, once adjustment of the torsional force in the element has been made. Additionally, signal means are provided which indicate whether or not the operating handle 57 is in engagement with the chuck to which the torsion element is secured.

The operating handle 57 consists of an insulating disc formed of material such as that sold on the market under the trade name "Bakelite" and has secured to its upper face by means of screws 59, a brass disc 60. The brass disc is of slightly greater diameter than the insulating disc and the peripheral edge 61 thereof forms an electrical contact surface for a brush 68. The handle thus formed is rotatably secured to the upper end of the wire chuck by means of the screw 62 and the collar 63. The opening in the brass disc 60 through which the screw 62 extends, is sufficiently large in diameter that the head of screw 62 will not come into contact with the brass disc to form an electrical connection between the chuck and the brass disc. Radially spaced from the center of the two discs and located near their circumferential edges is an elongated slot 64 that is adapted to receive one end of a bell crank 65. The other end of bell crank 65 is secured to the body of the torsion element chuck in such a manner that rotation of the handle 57 will cause the chuck to rotate. The width of the elongated slot 64 is made substantially greater than the diameter of the end of the bell crank that projects through it so that once adjustment of the torsional forces in the torsion element has been made, the handle can be moved out of direct engagement with the torsion element chuck so that slight movement of the handle 57 as occasioned by being struck by the operator in operating the instrument will not disturb the adjustment of the instrument. The elongated slot in the insulating material is made substantially greater in all dimensions than that in the brass cap so that electrical contact will be made between the brass disc 60 and the bell crank 65 on rotation of the handle 57. To indicate when electrical contact exists between the brass disc 60 and the bell crank 65, there is provided an electrical circuit which comprises in series, the bell crank 65, a battery 66, a light or other signal means 67, a brush 68 that is adapted to bear on the annular flange 61 of the brass disc 60, and the brass disc 60. When electrical contact is established between the bell crank 65 and the brass disc 60 of the handle 57, the light or signal means 67 is operated to indicate such contact. When this condition exists, extreme care must be exercised in coming in contact with the handle 57 if it is desired not to disturb the calibration of the instrument. Once the instrument has been calibrated, handle 57 is rotated to a position such that the bell crank 65 rests squarely in the center of the elongated slot 64. This condition will be indicated by the fact that the light 67 or other signal means has been disconnected. Slot 64 is made radially elongated to accommodate adjustments for length of bell crank used.

In Figure 5 there is shown a preferred embodiment of this invention. This figure differs from Figure 1 in that a V-block is used having V-grooves therein adapted to receive the torsion element chucks that are inclined in such a manner that the axis of the chucks will be in alignment with the axis of the torsion elements when the mass is suspended in calibrated position. The inclination of the torsion element chucks eliminates all drift that is occasioned by short bends in the torsion elements that have been set up in them in rotating the mass to its calibrated position.

Referring to Figure 5 in detail, the torsion element chucks 25 are shown mounted in operative position in the inclined V-grooves and the mass suspended in its calibrated position. The relative disposition of the grooves in the V-block 68 is best shown in Figure 8. Since the inclined grooves 69 and 70 in the V-block do not lie in the same plane, a different type of adjustable self-equalizing clamping means from those shown in Figures 1 and 2 must be used. The coil springs 28 and 29 and their anchors 30 are common for both forms of V-block.

The opposite ends of springs 28 and 29 from their anchor ends are secured to the ends of rods 71 and 72. Rods 71 and 72 have threaded over them and disposed intermediate their ends, wedging blocks 73, 74, 75 and 76. Since the bodies of the wire chucks do not lie in the same plane, these wedging blocks must of necessity be of different dimensions in order that they will press the bodies of the wire chucks firmly into the top and bottom V-groove bearing. The rods 71 and 72 are made circular in cross-section so that the wedging blocks 73 and 76 will turn freely on them. Since the wedging blocks 73 to 76 are pivotally mounted on the rods 71 and 72, force exerted by the springs on the ends of the rods 71 and 72 will press the wedging blocks 73 to 76 firmly against the bodies of the chucks 25 to hold them seated in their V-groove bearings. The relation between the rods 71 and 72, the wedging blocks 73 to 76, the torsion element chucks 25 and the inclined V-grooved V-blocks is shown in detail in Figures 6 and 7.

The operation of the gravity meter as shown in Figure 5 does not differ in any respect from that shown in Figure 1. However, since the inclination of the V-grooves in the V-blocks eliminates drift that would be present when using the device as shown in Figure 1, it is the preferred embodiment of the invention.

Another feature of this invention as illustrated in Figure 5 is the provision of chucks 77 and 78 by means of which the torsion elements 11 and 12 can be secured to the mass 10 so that when the mass has been rotated to its calibrated position, short bends will be eliminated from the bottom ends of the torsion elements. To this end wire chucks 77 and 78 which are secured to or formed integrally with the mass are so positioned on the mass that the grooves in the chucks that are adapted to receive and clamp the bottom ends of the torsion elements, are in axial alignment with the main body portion of the elements when the mass is in calibrated position.

Many other detailed features that may be added as refinements to the gravity meter illustrated will immediately be apparent to those skilled in the art and it is to be understood that the scope of this invention includes the principles of this invention regardless of whether or not these numerous additional features are incorporated.

We claim:

1. An instrument for measuring gravitational force or variations in gravitational force that comprises in combination a support, a torsion head base secured to said support, a V-block torsion head mounted on the torsion head base, said V-block torsion head having bearing grooves therein of substantially V-shaped cross-section, chucks disposed in said grooves, self equalizing and adjusting means for firmly holding the chucks in the grooves, torsion elements having one of their ends secured to the chucks, and a mass secured to and supported by the free ends of the torsion elements, whereby a rotation of the chucks to set up torsional forces in the torsion elements will adjust the sensitivity of the mass to vertical components of gravitational force acting upon it.

2. An instrument for measuring gravitational force or variations in gravitational force that comprises in combination a support, a torsion head base rotatably secured to said support, means for frictionally holding the torsion head base in its rotated position, a V-block torsion head mounted on the torsion head base, said V-block torsion head having bearing grooves therein of substantially V-shaped cross-section, chucks disposed in said grooves, self equalizing and adjusting means for firmly holding the chucks in the grooves, torsion elements having one of their ends secured to the chucks, and a mass secured to and supported by the free ends of the torsion elements whereby a rotation of the chucks to set up torsional forces in the torsion elements will adjust the sensitivity of the mass to vertical components of gravitational force acting upon it.

3. An instrument for measuring gravitational force or variations in gravitational force that comprises in combination a support, a torsion head base secured to said support, a V-block torsion head mounted on the torsion head base, said V-block torsion head having parallel bearing grooves therein of substantially V-shaped cross-section, chucks disposed in said grooves, self equalizing and adjusting means for firmly holding the chucks in the grooves, torsion elements having one of their ends secured to the chucks, and a mass secured to and supported by the free ends of the torsion elements whereby a rotation of the chucks to set up torsional forces in the torsion elements will adjust the sensitivity of the mass to vertical components of gravitational force acting upon it.

4. An instrument for measuring gravitational force or variations in gravitational force that comprises in combination a support, a torsion head base secured to said support, a V-block torsion head mounted on the torsion head base, said V-block torsion head having bearing grooves therein of substantially V-shaped cross-section, chucks disposed in said grooves, self equalizing and adjusting means for firmly holding the chucks in the grooves, torsion elements having one of their ends secured to the chucks, a mass secured to and supported by the free ends of the torsion elements, and means for rotating the chucks to set up torsional forces in the torsion elements whereby a rotation of the chucks to set up torsional forces in the torsion elements will adjust the sensitivity of the mass to vertical components of gravitational force acting upon it.

5. An instrument for measuring gravitational force or variations in gravitational force that comprises in combination a support, a torsion head base secured to said support, a V-block torsion head mounted on the torsion head base, said V-block torsion head having bearing grooves therein of substantially V-shaped cross-section, chucks disposed in said grooves, self equalizing and adjusting means for firmly holding the chucks in the grooves, torsion elements having one of their ends secured to the chucks, a mass secured to and supported by the free ends of the torsion elements, means for rotating the chucks to set up torsional forces in the torsion elements, and means for indicating when the means for rotating the chucks are in direct engagement with the chucks, whereby the operator of the instrument would be warned against moving the rotating means once the instrument has been calibrated.

6. An instrument for measuring gravitational force or variations in gravitational force that comprises in combination a support, a torsion head base secured to said support, a V-block torsion head mounted on the torsion head base, said V-block torsion head having inclined bearing grooves therein of substantially V-shaped cross-section, chucks disposed in said grooves, self equalizing and adjusting means for firmly holding the chucks in the grooves, torsion elements having one of their ends secured to the chucks, and a mass secured to and supported by the free ends of the torsion elements, the inclination of the bearing grooves and the chucks disposed within them being such that the chucks and torsion elements are in axial alignment when the mass is in calibrated position, whereby drift occasioned by short bends in the torsion elements will be eliminated.

7. An instrument for measuring gravitational force or variations in gravitational force that comprises in combination a support, a torsion head base secured to said support, a V-block torsion head mounted on the torsion head base, said V-block torsion head having inclined bearing grooves therein of substantially V-shaped cross section, chucks disposed in said grooves, self equalizing and adjusting means for firmly holding the chucks in the grooves, torsion elements having one of their ends secured to the chucks, and a mass adapted to be supported by the free ends of the torsion elements, chucks carried by the mass for securing the free ends of the torsion elements to the mass, the inclination of the bearing grooves and the chucks disposed within them as well as the chucks carried by the mass, being such that the chucks and torsion elements are in axial alignment when the mass is in calibrated position, whereby drift occasioned by short bends in the torsion elements will be eliminated.

8. An instrument for measuring gravitational force or variations in gravitational force that comprises in combination a support, a torsion head base rotatably secured to said support, means for frictionally holding the torsion head base in its rotated position, a V-block torsion head mounted on the torsion head base, said V-block torsion head having bearing grooves therein of substantially V-shaped cross-section, chucks disposed in said grooves, means for rotating said chucks in the grooves, self equalizing and adjusting means for firmly holding the chucks in their rotated position in the grooves, torsion elements having one of their ends secured to the chucks, and a mass secured to and supported by the free ends of the torsion elements whereby a rotation of the chucks to set up torsional forces in the torsion elements will adjust the sensitivity of the mass to vertical components of gravitational force acting upon it.

9. An instrument for measuring gravitational force or variations in gravitational force that comprises in combination a support, a torsion head base secured to said support, a V-block torsion head mounted on the torsion head base, said V-block torsion head having a pair of top bearing grooves and a pair of bottom bearing grooves vertically disposed therein, each of the top pair of bearing grooves being in respective alignment with the bottom pair of bearing grooves, all of said bearing grooves being of substantially V-shaped cross-section, chucks disposed in said grooves in such a manner that a top portion of each chuck is seated in one of the top pair of bearing grooves and the bottom portion of each chuck is seated in one of the bottom pair of bearing grooves, common means for resiliently holding the tops of the chucks in the top pair of bearing grooves and common means for resiliently holding the bottom portions of the chucks in the bottom pair of bearing grooves, means for rotating the chucks in their bearings, torsion elements having one of their ends secured to the chucks, and a mass secured to and supported by the free ends of the torsion elements, whereby a rotation of the chucks to set up torsional forces in the torsion elements will adjust the sensitivity of the mass to vertical components of gravitational force acting upon it.

10. An instrument for measuring gravitational force or variations in gravitational force that comprises in combination a support, a torsion head base secured to said support, a V-block torsion head mounted on the torsion head base, said V-block torsion head having a pair of top bearing grooves and a pair of bottom bearing grooves therein, each of the top pair of bearing grooves being in respective alignment with the bottom pair of bearing grooves, all of said bearing grooves being of substantially V-shaped cross-section, chucks disposed in said grooves in such a manner that a top portion of each chuck is seated in one of the top pair of bearing grooves and the bottom portion of each chuck is seated in one of the bottom pair of bearing grooves, common means for resiliently holding the tops of the chucks in the top pair of bearing grooves and common means for resiliently holding the bottom portions of the chucks in the bottom pair of bearing grooves, means for rotating the chucks in their bearings, torsion elements having one of their ends secured to the chucks, and a mass secured to and supported by the free ends of the torsion elements, whereby a rotation of the chucks to set up torsional forces in the torsion elements will adjust the sensitivity of the mass to vertical components of gravitational force acting upon it.

11. An instrument for measuring gravitational force or variations in gravitational force that comprises in combination a support, a torsion head base secured to said support, a torsion head mounted on the torsion head base, chucks rotatably disposed in the torsion head, means for firmly holding the chucks in the torsion head, torsion elements having one of their ends secured to the chucks, a mass secured to and supported by the free ends of the torsion elements, means for rotating the chucks in the torsion head to set up torsional forces in the torsion elements, and means for disengaging the rotating means from the chucks whereby accidental movement of the rotating means once the instrument is calibrated will not disturb the calibration of the instrument.

12. An instrument for measuring gravitational force or variations in gravitational force that comprises in combination a support, a torsion head base secured to said support, a torsion head mounted on the torsion head base, chucks rotatably disposed in the torsion head, means for firmly holding the chucks in the torsion head, torsion elements having one of their ends secured to the chucks, a mass secured to and supported by the free ends of the torsion elements, means for rotating the chucks in the torsion head to set up torsional forces in the torsion elements, and means in engagement with one of the chucks in the torsion head operable to raise or lower the chuck to orient the mass relative to the horizontal plane of the support whereby compensation can be made for differences in length of torsion elements.

13. An instrument for measuring gravitational force or variations in gravitational force that comprises in combination a casing, a support carried by or made integral with said casing, a torsion head base secured to said support, a torsion head mounted on the torsion head base, chucks rotatably disposed in the torsion head, means for firmly holding the chucks in the torsion head, torsion elements having one of the ends secured to the chucks, a mass secured to and supported by the free ends of the torsion elements, means for rotating the chucks in the torsion head to set up torsional forces in the torsion elements, and means extending to a point outside of the casing and in engagement with one of the chucks in the torsion head operable to raise and lower the chuck to orient the mass relative to the horizontal plane of the support whereby compensation can be made for differences in length of torsion elements.

14. A gravity meter of the type which employs a bifilar suspension for the mass that comprises in combination, a case, a torsion head base carried by said case, a torsion head having grooves therein of substantially V-shape cross-section, chucks having their body portion disposed within the V-grooves in said torsion head, self-adjusting and self equalizing means for holding the chucks firmly in the V-grooves of the block, torsional-suspension elements secured at one end to the chucks, a mass carried by the other ends of the torsional-suspension elements, means for varying the torsional forces in the torsional-suspension elements, and means for maintaining in the torsional-suspension elements these forces whereby action of vertical components of gravitational force on the mass will displace it a determinable amount.

DAYTON H. CLEWELL.
HENRY A. MAEDER.